United States Patent [19]
Yasuda et al.

[11] Patent Number: 5,124,075
[45] Date of Patent: Jun. 23, 1992

[54] ELECTRO-CONDUCTIVE SHEETS COMPRISING CARBON FIBRILS IN ELECTRICALLY INSULATING POLYMER MATERIAL

[75] Inventors: Naoshi Yasuda; Masaki Nagata, both of Tokyo, Japan

[73] Assignee: Hyperion Catalysis International, Inc., Lexington, Mass.

[21] Appl. No.: 557,420

[22] Filed: Jul. 23, 1990

[51] Int. Cl.$^5$ .......................... B32B 9/00; H01B 1/24; H01M 4/66
[52] U.S. Cl. ..................... 252/511; 427/249; 428/220; 428/332; 428/339; 428/367; 428/368; 428/408; 428/924; 524/495; 524/496
[58] Field of Search ............... 252/511; 524/495, 496; 428/367, 408, 368, 332, 339

[56] References Cited

U.S. PATENT DOCUMENTS 4,663,230  5/1987  Tennent .............................. 428/367

*Primary Examiner*—A. Lionel Clingman
*Attorney, Agent, or Firm*—Curtis, Morris & Safford

[57] ABSTRACT

An electro-conductive sheet having a thickness between 10 and 200 microns that includes carbon fibrils having diameters within the range 0.0036 to 0.5 microns and length to diameter ratios of at least 5 in an electrically insulating polymer material.

1 Claim, 1 Drawing Sheet

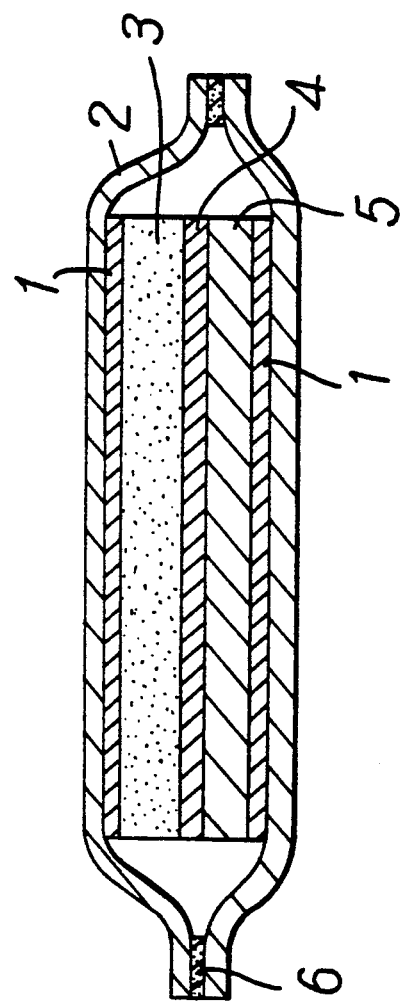

ELECTRO-CONDUCTIVE SHEETS COMPRISING CARBON FIBRILS IN ELECTRICALLY INSULATING POLYMER MATERIAL

BACKGROUND OF THE INVENTION

The present invention concerns electro-conductive sheets, which contain a certain type of carbon fibers and are particularly useful as a collector sheet for batteries.

The batteries currently available on the market can be categorized into two general types, cylindrical and flat shaped. Generally speaking, batteries are constructed by sandwiching an electro-conductive sheet between the anode layer and an outside collector plate, or between the cathode layer and an outside collector plate.

Conventionally, sheets made of a mixture of graphite powder, acetylene black, active carbon powder, etc. and elastic polymer material were used as the aforementioned collector sheet.

The characteristics required for the aforementioned electro-conductive sheet in a battery are (1) superior electric conductivity, (2) possibility to produce a thin sheet without pin holes, (3) flexibility and possibility to make good contact with the anode or cathode layer as well as with the outside collector plate, (4) not causing swelling or deterioration by contacting with electrolytes for a long period of time. However, conventional electro-conductive sheets do not easily form a uniform film and have flaws such as pin-hole formation and poor contact with the anode and cathode layers, or the outside collector plate.

SUMMARY OF THE INVENTION

The inventors of the present invention discovered through an intensive study that the aforementioned problems could be solved by using an electrically insulating polymer sheet with a specific thickness which contained a certain type of carbon fibers. Hence the present invention was achieved.

The present invention offers electro-conductive sheets whose thickness is greater than 10 microns but less than 200 microns, and which contain, in an electrically insulating polymer material, hollow carbon fibrils, whose diameters are within the range of 0.0035 to 0.5 microns and whose length is at least 5 times the diameter.

The diameter of the carbon fibrils used in the present invention is 0.0035 to 0.5 microns, 0.0035 to 0.04 microns is more desirable and 0.075 to 0.03 microns is most desirable. The length is greater than 5 times the diameter, or, better, $10^2$ to $10^4$ times the diameter.

Carbon fibrils do not provide enough electrical conductivity when their diameter exceeds 0.5 microns, while carbon fibrils with less than 0.0035 microns tend to fly around resulting in handling problems. In addition, electrical conductivity becomes poor when the length of the carbon fibrils is less than 5 times the diameter.

The carbon fibrils may be surface treated with ozone, nitric acid, etc. prior to the use.

It is preferable that the carbon fibrils have an outer zone which consists of continuous, multiple layers of uniformly oriented carbon atoms and an inner core. It is also preferable that they be cylindrical carbon fibrils in which the multiple layers and the inner core are coaxially aligned along the center axis of the fibrils. It is also preferable that the inner core be hollow and contain less uniformly oriented carbon atoms than the outer layers, that the uniformly oriented carbon atoms be in the form of graphitic carbon, and that the diameter of the inner core be greater than 2 nm.

The carbon fibrils can be produced as described in, for example, Tennant, U.S. Pat. No. 4,663,230.

More specifically, carbon fibrils can be produced by contacting suitable metal containing particles (for example, iron, cobalt, or nickel particles with alumina as a carrier) and a suitable carbon containing gaseous organic compound (for example, carbon monoxide) at 850° to 1200° C. under a suitable pressure (for example, 0.1 to 10 atm.) for a suitable period of time (for example, 10 seconds to 180 minutes), where the dry weight ratio between the carbon containing organic compound and the metal containing particles is at least 100:1 (carbon containing organic compound:metal containing particles).

The desirable surface interval of the carbon fibrils measured by wide angle X-Ray diffractometry is 3.38 to 3.50A, and the desirable diffraction angle is 25.5 to 26.3 degrees.

The desirable amount of carbon fibrils is greater than 5 wt%, or preferably 5 to 60 wt%, versus the electrically insulating polymer compound. When the ratio is below 5 wt%, sufficient electrical conductivity cannot be obtained, while the ratio above 60 wt% tends to lower the physical strength of the electro-conductive sheet, and also results in a poor contact with the anode or cathode layer, or outside collector plate.

It is preferable that the electrically insulating polymer material used in the present invention be stable against alkaline solutions and acid solutions. Furthermore, it is preferable that the electrically insulating polymer compound be soluble in at least one kind of organic solvent because it is desirable to use the polymer in the form of a solution.

As an example for such electrically insulating polymer compounds, 1,4-polybutadiene, natural rubber, polyisoprene, SBR, NBR, EPDM, EPM, urethane rubber, polyester rubber, chloroprene rubber, epichlorhydrin rubber, silicone rubber, styrene-butadiene-styrene block co-polymers, (called SBS hereinafter), styrene-isoprene-styrene block co-polymers (called SIS hereinafter), styrene-ethylene butylene-styrene co-polymers (called SEBS hereinafter), butyl rubber, phosphazine rubber, polyethylene, polypropylene, polyethyleneoxide, polypropyleneoxide, polystylene, vinylchloride, ethylene-ethylacetate copolymers, 1,2-polybutadiene, epoxy resin, phenol resin, cyclic polybutadiene, cyclic polyisoprene, polymethylmethacrylate, and mixtures of these materials can be mentioned. Among these materials, thermo-plastic materials such as SBS, SIS, SEBS, 1,2-polybutadiene, etc. are preferred. Particularly, a material whose ASTM-A hardness is below 90 is preferred in terms of flexibility.

The electro-conductive sheets covered by the present invention can be obtained by mixing, for example, the aforementioned particular carbon fibrils with a solution of an electrically insulating polymer compound, and then forming a sheet.

In order to uniformly disperse carbon fibrils in the electrically insulating polymer compound, carbon fibrils are mixed with a 3 to 25 wt% solution of polymer compound using a mixing device such as a ball mill. The obtained mixture (slurry) is coated on a flat sheet such as parchment paper with an applicator, then dried in order to form a film in which carbon fibrils are oriented parallel to the surface of the sheet. Carbon fibrils do not disperse uniformly when the polymer content in the polymer solution is below 3 wt%, and the obtained sheet tends to generate pin-holes. On the other hand, when the polymer content exceeds 25 wt%, the viscosity of the solution becomes too high, making it more difficult to obtain uniform sheets.

Other features and advantages will be apparent from the following description of the preferred embodiments thereof, and from the claims.

DESCRIPTION OF THE PREFERRED EMBODIMENTS

We first briefly describe the Figure.

The figure is a cross-sectional view of a battery produced by the Test Examples and the Reference Test Example described below. The battery includes the following: electro-conductive sheet (1), stainless steel (2), anode compound (3), electrolyte sheet (4), zinc (5), and epoxy adhesive (6).

APPLICATION EXAMPLES

The present invention will be explained in further detail using the following application examples.

APPLICATION EXAMPLES 1 THROUGH 4

As an electrically insulating polymer compound, SBS (specific gravity: 0.96, manufactured by Nippon Synthetic Rubber Co., Ltd., TR-2000) was dissolved in toluene, and a 10 wt% toluene solution was obtained. Carbon fibrils, whose diameter and length were 0.015 micron and 2 microns respectively, were added to this solution at 10, 20, 35, and 50 wt% against SBS, and the mixture was kneaded for a period of 2 hours using a ball mill. This mixture was coated on a polyester film whose surface was coated with a silicone releasing agent, using an applicator bar (200 micron gap). Electro-conductive sheets about 20 micron thick were obtained by air drying them first and then vacuum drying overnight. The appearance of each sheet was observed at this stage.

Subsequently, the electrical resistivity of the sheets was measured. The measurement of the electric resistivity was done by the four-probe method at 1 KHz frequency. The results are shown in Table 1.

REFERENCE EXAMPLE 1

An electro-conductive sheet was produced by following the same procedure used for Application Examples 1 through 4, but adjusting the ratio of carbon fibrils against SBS to 2.5 wt%. Its electrical conductivity was measured and the results are shown in Table 1.

TABLE 1

| | Appl. Ex. 1 | Appl. Ex. 2 | Appl. Ex. 3 | Appl. Ex. 4 | Ref. Ex. 1 |
|---|---|---|---|---|---|
| SBS Content (wt %) | 10 | 10 | 10 | 10 | 10 |
| Fibril Content (wt %) | 10 | 20 | 35 | 50 | 2.5 |
| Thickness (microns) | 15 | 17 | 20 | 22 | 12 |

TABLE 1-continued

| | Appl. Ex. 1 | Appl. Ex. 2 | Appl. Ex. 3 | Appl. Ex. 4 | Ref. Ex. 1 |
|---|---|---|---|---|---|
| Appearance | good | good | good | good | pin holes |
| Conductivity | $8 \times 10^{-2}$ | $1.4 \times 10^{-1}$ | $1.8 \times 10^{-1}$ | $2 \times 10^{-1}$ | $7 \times 10^{-3}$ |

(Test Examples 1 through 4, Reference Test Example 1)

Electrolysis manganese-oxide (62 wt parts), acetylene black (8 wt parts), ammonium chloride (14 wt parts), zinc chloride (1 wt part), water (12 wt parts), mercury chloride (0.1 wt part), and Karaya rubber (0.2 wt part) were mixed and kneaded overnight using a ball mill. An anode compound was obtained by compressing this mixture at 25 kg/cm$^2$.

Subsequently, an electrolyte solution consisting of ammonium chloride (35 wt parts), zinc chloride (10 wt parts), and water (55 wt parts) was mixed with a suspension prepared by dispersing 300 g of starch in 1 liter of water at solution:suspension = 1:10 (wt ratio), and this mixture was coated on Kraft paper 80 μm thick in order to obtain an electrolyte sheet.

Finally, laminated sheets (anode plate) prepared by pressing the electro-conductive sheets obtained by Application Examples 1 through 4 and Reference Example 1 onto an outside collector plate made of stainless (sus) steel at 120° C. and 20 kg/cm$^2$, and laminated plates (cathode plate) prepared by sandwiching each electro-conductive sheet between a stainless (sus) steel plate and a zinc cathode plate at 120° C. and 20 kg/cm$^2$, were created, and assembled in the order of cathode plate, electrolyte sheet, anode compound, and anode plate, and compressed at 30 kg/cm$^2$ in order to obtain a battery as shown in the Figure. The electrical discharge capacity down to 1.0 volt (per unit weight of anode compound) of the obtained battery was measured by discharging at 10 mA/cm$^2$. The discharge initiating voltage was 1.65 V. Results are shown in Table 2.

TABLE 2

| | Test Ex. 1 | Test Ex. 2 | Test Ex. 3 | Test Ex. 4 | Ref. Ex. 1 |
|---|---|---|---|---|---|
| Type of Electro-Conductive Sheet | Appl. Ex. 1 | Appl. Ex. 2 | Appl. Ex. 3 | Appl. Ex. 4 | Ref. Ex. 1 |
| Discharge Capacity ((mAh/g) | 38 | 41 | 42 | 42 | 18 |

Electro-conductive sheets covered by the present invention can be made into a film without pin-holes with an accurate thickness. They also have superior adhesive characteristics and electrical conductivities. In addition, they do not cause swelling or deterioration by contacting with an electrolyte for a long period of time.

Furthermore, batteries produced using these electro-conductive sheets have relatively small loss caused by the internal resistance during the discharge, hence offering batteries with superior discharge capacity and storage stability.

Other embodiments are within the following claims.

We claim:

1. An electro-conductive sheet having a thickness between 10 and 200 microns comprising between 5 and 60 weight percent carbon fibrils having diameters within the range 0.0036 to 0.05 microns and length to diameter ratios of at least 5 in an electrically insulating polymer material.

* * * * *